3,706,764
PHENETHYLAMINOMETHYL-CHROMANONES
AND- THIOCHROMANONES
Michio Nakanishi, Oita, and Tomohiko Munakata and Shinro Setoguchi, Fukuoka, Japan, assignors to Yoshitomi Pharmaceutical Industries, Ltd., Osaka, Japan
No Drawing. Filed Apr. 13, 1970, Ser. No. 27,997
Claims priority, application Japan, Apr. 16, 1969,
44/29,899
Int. Cl. A61k 27/00; C07d 7/20, 65/08
U.S. Cl. 260—327 TH 6 Claims

ABSTRACT OF THE DISCLOSURE

Phenethylamine derivatives of the formula

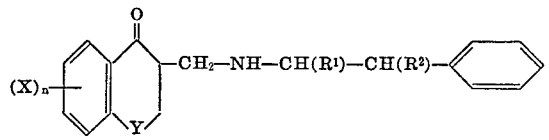

wherein Y is $-CH_2-$, $-O-$, $-S-$ or $-SO_2-$, X is Cl, $CH_3O$ or $CH_3$, $n$ is 0, 1 or 2, $R^1$ is H, $CH_3$ or $CH_2OH$, and $R^2$ is H or OH and pharmaceutically acceptable, acid-addition salts thereof, are useful as antidepressants.

This invention relates to novel and therapeutically valuable phenethylamine derivatives.

The novel phenethylamine derivatives of this invention are compounds of the formula

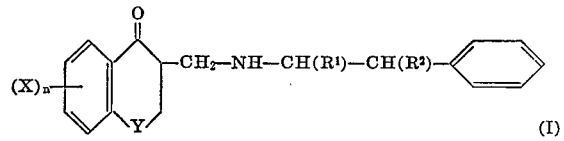

and pharmaceutically acceptable, acid-addition salts thereof, wherein Y represents $-CH_2-$, $-O-$, $-S-$ or $-SO_2-$, $n$ represents 0, 1 or 2, X is Cl, $CH_3O$ or $CH_3$, $R^1$ represents H, $CH_3$ or $CH_2OH$, and $R^2$ represents H or OH.

The compounds of Formula I can be produced by the Mannich reaction, that is, by reacting a compound cf the formula

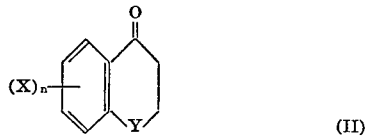

wherein X, Y and $n$ are as set forth above, with a compound of the formula

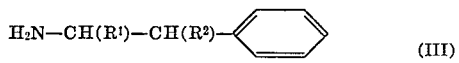

wherein $R^1$ and $R^2$ are as set forth above, or a salt thereof, such as the hydrochloride, and formaldehyde or a formaldehyde supplying substance such as paraformaldehyde.

The reaction is usually carried out in a solvent generally employed in the Mannich reaction, such as water, methanol, ethanol or isopropanol, under reflux, for 0.5 to several hours.

The starting compound of Formula III is usually employed as an acid-addition salt, such as the hydrochloride, so that the product (I) is usually obtained in the form of a salt with the same acid. Such salt may, if necessary, be converted into the free base by conventional alkali treatment. Further, the free base thus obtained may be converted into other acid-addition salts by reaction with various inorganic or organic acids, such as sulfuric, nitric, maleic, oxalic, fumaric, citric, tartaric, malic acids and the like. However, obviously when a starting compound of Formula III is used in the form of a salt with the desired acid, the product of Formula I is directly obtained as a salt of that acid and need not be treated further.

The compounds of Formula I and their pharmaceutically acceptable acid-addition salts have strong reserpine antagonistic activity as shown, for example, by the following test.

The test for reserpine antagonistic activity was performed essentially in accordance with the method described by R. Fielden et al. in "Method in Drug Evaluation," pages 149-157 (North-Holland Publishing Company, Amsterdam, 1966; Editors: P. Mantegazza and F. Piccinini). The results of the test are set forth in the following table, wherein $RD_{30}$ is the subcutaneous dose of the test compound which prevents ptosis caused by the administration of reserpine in 30% of the mice.

| Test compound: | Reserpine antagonistic activity $RD_{30}$ mg./kg. body weight |
|---|---|
| A | 2.5–5 |
| B | 2.5–5 |
| C | 2.5–5 |
| D | 2.5–5 |

In the above table, the test compounds, designated by letters, are as follows:

(A) 3-[N-(2-hydroxy-1-methyl-2-phenylethyl)aminomethyl]chroman-4-one hydrochloride
(B) 3-[N-(1-methyl-2-phenylethyl)aminomethyl]chroman-4-one hydrochloride
(C) 3-[N-(1-methyl-2-phenylethyl)aminomethyl]thiochroman-4-one hydrochloride
(D) 2-[N-(2-hydroxy-1-methyl-2-phenylethyl)aminomethyl]-6-chlorothiochroman-4-one hydrochloride The actute toxicities of the above compounds administered intraperitoneally to mice are as follows:

| Compound: | $LD_{50}$ mg./kg. |
|---|---|
| A | 160–320 |
| B | 80–160 |
| C | 80–106 |
| D | 160–320 |

In view of various tests, including those mentioned above, the compounds of Formula I and their pharmaceutically acceptable, acid-addition salts can be safely administered as antidepressants in the form of a pharmaceutical preparation with a suitable and conventional carrier or adjuvant, administrable orally or by way of injection, without harm to the host.

The pharmaceutical compositions may take any conventional form such as tablets, capsules, granules, powders, syrups, injectables and the like.

The following are illustrative examples of formulations to be administered when compounds of Formula I and their acid-addition salts are administered for pharmaceutical purposes.

(a) Capsules are prepared from the following composition:

| | Mg. |
|---|---|
| Compound A | 27.9 |
| Lactose | 50.0 |
| Starch | 22.1 |
| | 100.0 |

(b) Tablets are prepared from the following composition:

|                | Mg.  |
|----------------|------|
| Compound B     | 28.1 |
| Lactose        | 65.0 |
| Starch         | 26.9 |
|                | 100.0|

(c) Powders (10%) are prepared from the following composition:

|                | G.   |
|----------------|------|
| Compound C     | 11.2 |
| Lactose        | 70.0 |
| Starch         | 18.8 |
|                | 100.0|

The daily antidepressant dose of compounds of Formula I or pharmaceutically acceptable salts thereof in warm-blooded animals may usually range from about 0.5 to about 4.0 mg./kg. of body weight. For example, the usual daily dose for adult humans for this purpose may range from about 50 to 250 milligrams (e.g., about 2 to 10 tablets or capsules of either formulation (a) or (b), above).

In the following illustrative examples of typical and presenlty preferred embodiments of the invention, "g." and "ml." represent "gram(s)" and "milliliter(s)", respectively.

EXAMPLE 1

A mixture of 7.4 g. of chroman-4-one, 9.5 g. of norephedrine hydrochloride, 5 g. of paraformaldehyde and 10 ml. of ethanol is refluxed for 3 hours. After allowing the mixture to cool overnight, the crystals precipitated are collected by filtration and recrystallized from 50% aqueous ethanol to give 5 g. of 3-[N-(2-hydroxy-1-methyl-2-phenylethyl)aminomethyl]chroman - 4 - one hydrochloride melting at 182° to 185° C.

EXAMPLE 2

A solution of 16.7 g. of L-threo-2-amino-1-phenyl-1,3-propanediol in 10 ml. of ethanol is adjusted to pH 4-5 with ethanolic hydrochloric acid, 17.6 g. of 7-methoxy-1,2,3,4-tetrahydronaphthalin - 1 - one and 10 g. of paraformaldehyde are added thereto, and the whole is refluxed for 1 hour. After cooling, the precipitate is collected by filtration and recrystallized from 80% aqueous isopropanol to give 15 g. of L-threo-2-[N-(2-hydroxy-1-hydroxy-methyl - 2 - phenylethyl)aminomethyl]-7-methoxy-1,2,3,4-tetrahydronaphthalin-1-one hydrochloride melting at 174° to 175° C. and showing $[\alpha]_D^{20} = -27.4°$ (c.=0.02, methanol).

EXAMPLE 3

A mixture of 17 g. of amphetamine hydrochloride, 12.6 g. of 1,2,3,4-tetrahydronaphthalin-1-one, 10.8 g. of paraformaldehyde and 14 ml. of ethanol is refluxed for 3 hours. After cooling, the precipitate is collected by filtration and recrystallized from ethanol to give 25 g. of 2-[N-(1 - methyl - 2 - phenylethyl)aminomethyl]-1,2,3,4-tetrahydronaphthalin-1-one hydrochloride melting at 166° to 167° C.

EXAMPLE 4–10

Proceeding by the method of the above examples, but substituting equivalent amounts of appropriate starting materials, the following compounds are also produced.

(4) 3-[N-(1-methyl - 2 - phenylethyl)aminomethyl]-chroman - 4 - one, its hydrochloride melting at 180° to 183° C.;

(5) 2-[N-(1-methyl - 2 - phenylethyl)aminomethyl]-7-methoxy-1,2,3,4-tetrahydronaphthalin-1-one, its hydrochloride melting at 186° C.;

(6) 3-[N-(1-methyl - 2 - phenylethyl)aminomethyl]-thiochroman-4-one, its hydrochloride melting at 151° to 153° C.;

(7) 2 - [N-(2-hydroxy-1-methyl-2-phenylethyl)aminomethyl-6-chlorothiochroman - 4 - one, its hydrochloride melting at 162° to 164° C.;

(8) 2 - [N-(2-hydroxy-1-methyl-2-phenylethyl)aminomethyl]-6,7-dimethyl - 1,2,3,4 - tetrahydronaphthalin-1-one, its hydrochloride melting at 175° C.;

(9) 2 - [N-(2-hydroxy-1-methyl-2-phenylethyl)aminomethyl]-7-methoxy - 1,2,3,4 - tetrahydronaphthalin-1-one, its hydrochloride melting at 175° C. and shown $[\alpha]_D^{20} = +51.5°$ (c.=0.02, methanol).

(10) 2-[N-(2 - hydroxy - 1 - methyl-2-phenylethyl)-aminomethyl]thiochroman-4-one 1,1-dioxide, its hydrochloride melting at 245° to 246° C.

What is claimed is:

1. A compound selected from the group consisting of phenethylamine derivatives of the formula:

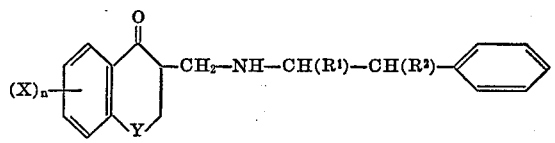

wherein Y is a member selected from the group consisting of —O—, —S— and —SO$_2$—; n represents an integer of 0, 1, or 2; X represents a member selected from the group consisting of Cl, CH$_3$O and CH$_3$; R$^1$ is a member selected from the group consisting of H, CH$_3$, and CH$_2$OH; and R$^2$ is a member selected from the group consisting of H and OH, and the pharmaceutically acceptable, acid-addition salts thereof.

2. A compound of claim 1 having the name 3-[N-(2-hydroxy-1-methyl - 2 - phenylethyl)aminomethyl]chroman-4-one.

3. A compound of claim 1 having the name 3-[N-(1-methyl-2-phenylethyl)aminomethyl]chroman-4-one.

4. A compound of claim 1 having the name 3-[N-(1-methyl-2-phenylethyl)-aminomethyl]thiochroman-4-one.

5. A compound of claim 1 having the name 6-chloro-2-[N-(2-hydroxy - 1 - methyl - 2 - phenylethyl)aminomethyl]thiochroman-4-one.

6. A compound of claim 1 having the name 2-[N-(2-hydroxy - 1 - methyl - 2 - phenylethyl)aminomethyl]thiochroman-4-one 1,1-dioxide.

References Cited

Chu, et al., C. A. 52:11044 (8–58).

Kaushiva, Ann. Biochem. Exptl. Med. (Calcutta), Suppl. 20, pp. 493–504 (1960).

HENRY R. JILES, Primary Examiner

C. M. S. JAISLE, Assistant Examiner

U.S. Cl. X.R.

260—345.2, 345.5, 501.18, 570.5 C, 570.8 R; 424—275, 283, 316